United States Patent [19]

Schmidt

[11] Patent Number: 4,750,803
[45] Date of Patent: Jun. 14, 1988

[54] CONNECTOR FOR OPTICAL FIBRES HAVING A RADIAL VENT HOLE OPENING COMMUNICATING WITH A SURFACE DUCT

[75] Inventor: Bernhard Schmidt, Neunkirchen, Fed. Rep. of Germany

[73] Assignee: U.S. Philips Corp., New York, N.Y.

[21] Appl. No.: 841,131

[22] Filed: Mar. 18, 1986

[30] Foreign Application Priority Data

Mar. 22, 1985 [DE] Fed. Rep. of Germany ....... 3510423

[51] Int. Cl.$^4$ ............................................. G02B 6/38
[52] U.S. Cl. ................................................. 350/96.21
[58] Field of Search ................ 350/96.20, 96.21, 96.22

[56] References Cited

U.S. PATENT DOCUMENTS

| | | | |
|---|---|---|---|
| 4,361,380 | 11/1982 | Marazzi | 350/96.21 |
| 4,371,233 | 2/1983 | Masuda | 350/96.21 |
| 4,487,474 | 12/1984 | Nishie et al. | 350/96.21 |
| 4,662,713 | 5/1987 | Davies et al. | 350/97.20 |
| 4,676,587 | 6/1987 | Mori | 350/96.20 |

FOREIGN PATENT DOCUMENTS 58-130311 8/1983 Japan .

*Primary Examiner*—William L. Sikes
*Assistant Examiner*—Frank González
*Attorney, Agent, or Firm*—Thomas A. Briody; Jack E. Haken

[57] ABSTRACT

The invention relates to a connector for optical fibres, notably monomode fibres, which includes a receptacle which is accommodated in a housing sleeve. At least one connector pin is inserted into the receptacle. The connector pin is provided with a collar which is axially pressed against the end face of the receptacle by a screw cap which can be screwed onto the end of the receptacle. The receptacle is provided with a radial vent hole at the area of the end face of the inserted connector pin, which vent hole opens into a free space which extends in the axial direction between the receptacle and the housing sleeve and wherefrom air can escape to the environment. In order to achieve reliable venting and to prevent the ingress of dirt into the interior of the receptacle, without a complex manufacturing operation being required, the free space is constructed as a duct (2) which is provided in the outer surface of the receptacle (3) and which extends in the axial direction over the entire length of the receptacle (3).

9 Claims, 1 Drawing Sheet

CONNECTOR FOR OPTICAL FIBRES HAVING A RADIAL VENT HOLE OPENING COMMUNICATING WITH A SURFACE DUCT

BACKGROUND OF THE INVENTION

The invention relates to a connector for optical fibres, notably monomode fibres. The connector includes a receptacle which is accomodated in a housing sleeve and in which there can be inserted at least one connector pin. The connector pin is provided with a collar which is axially pressed against the end face of the receptacle by a screw cap which can be screwed onto the end of the housing sleeve. The receptacle is provided with a radial vent hole at the area of the end face of the inserted connector pin, which vent hole opens into a free space which extends in the axial direction between the receptacle and the housing sleeve and wherefrom air can escape to the environment.

Notably connectors for monomode fibres require accurate and tight fits between the connector pin and the receptacle. Vents must be provided in order to allow the escape of air from the interior of the receptacle when the connector pin is inserted. In the device described above, these vents are not situated at the area of the fit between the connector pin and the receptacle, because ducts situated at that area would affect the bearing strength of the connector pin and allow for penetration of dirt, moreover, they would also necessitate a complex manufacturing process. Therefore, it is attractive to construct the vents in the described manner.

According to the previous proposal, the threaded portion of the housing sleeve covered by the screw cap was provided with a radial vent hole wherethrough the air could escape from the free space to the environment via the thread. In order to ensure that the outer vent hole indeed opens into the free space between the receptacle and the housing sleeve, the exterior of the housing sleeve had to be subjected to a complex grinding operation so as to form an annular free space. Moreover, loose particles from the thread could be forced into the outer vent hole and reach, via the further vents, the space for accomodating the connector pin.

SUMMARY OF THE INVENTION

Therefore, it is an object of the invention to construct a connector of the kind set forth so that reliable venting is achieved without a complex manufacturing operation being required, whilst at the same time the penetration of dirt into the interior of the receptacle is precluded.

This object is achieved in that the free space is constructed as a duct which is provided in the outer surface of the receptacle and which extends in the axial direction over the entire length of the receptacle.

The duct can be advantageously constructed as a groove or as a flattened portion of the cylindrical outer contour of the receptacle.

BRIEF DESCRIPTION OF THE DRAWING

The drawing shows a preferred embodiment of a connector in accordance with the invention.

DESCRIPTION OF THE PREFERRED EMBODIMENTS

Figure 1:
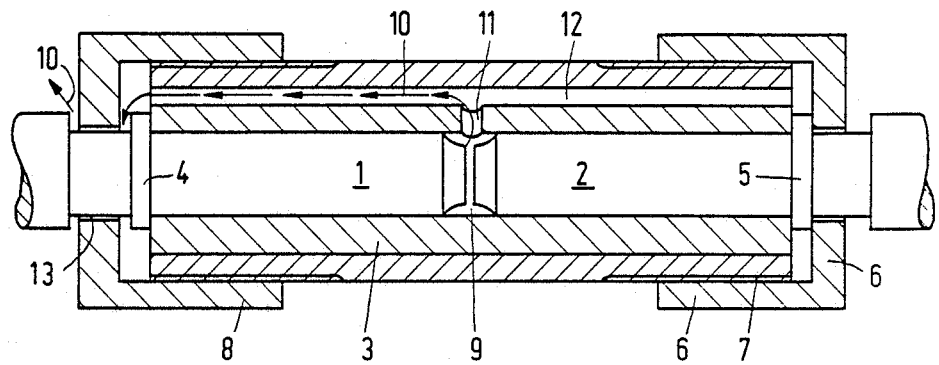
FIG. 1 is a longitudinal sectional view of a connector in accordance with the invention.

In the embodiment shown in FIG. 1, connector pins 1 and 2 wherein ends (not shown) of monomode fibres to be coupled are centrally guided are inserted into the receptacle 3 from both sides; collars 4 and 5 of the connector pins 1 and 2, respectively, bear against end faces of the receptacle 3.

As can be seen at the right in FIG. 1, the connector pin 2 is secured in the axial direction by a screw cap 6 screwed (by thread 7) onto the housing sleeve surrounding the receptacles 3. At the left the screw cap 8 is shown in a position in which it has not yet been completely screwed onto the sleeve. The fits between the connector pins 1 and 2 on the one side and the receptacle 3 on the other side are very precise and tight in order to ensure that the two connector pins are exactly coaxial; the latter is important notably for the coupling of monomode fibres.

When the connector pin 1 is introduced, after the connector pin 2 has already been secured in its ultimate position, the air escapes from the interior 9 of the receptacle 3 along the path denoted by arrows 10, that is to say first through the radial vent hole 11 and the duct 12 to the space between the screw cap 8 and the receptacle 3 and subsequently to the environment via the annular gap 13 between the screw cap 8 and the connector pin 1.

When the screw cap 8 is subsequently screwed against the collar 4, the vent denoted by the arrows 10 is shut off from the environment, so that dirt cannot penetrate.

Figures 2, 3:
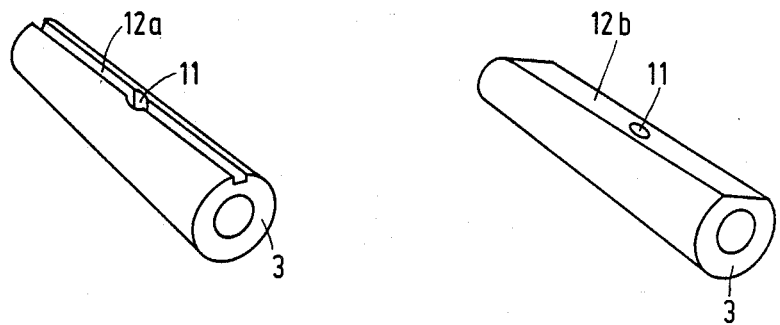
FIG. 2 is a perspective view of a receptacle provided with a duct in the form of a groove.
FIG. 3 shows a modified version of the receptacle provided with a duct in the form of a flattened portion.

The duct 12 extends over the length of the receptacle 3 without interruption and has to be provided only over a narrow portion of the circumference. It may be constructed, for example as a milled groove 12a as shown in FIG. 2 or as a flattened portion 12b of the outer contour of the receptacle 3 as shown in FIG. 3; such a construction does not require an elaborate manufacturing operation.

As an alternative for the embodiment shown in FIG. 1, in accordance with the invention it would also be possible to guide only the end of one optical fibre through a connector pin, the end of the second optical fibre then being centrally secured directly in the receptacle.

What is claimed is:

1. A connector for optical fibres, notably monomode fibres, which includes a receptacle which is accomodated in a housing sleeve and in which there can be inserted at least one connector pin which is provided with a collar which is axially pressed against an end face of the receptacle by a screw cap which can be screwed onto an end of the housing sleeve, the receptacle being provided with a radial vent hole at an area of an end face of an inserted connector pin, which vent hole opens into a free space which extends in the axial direction between the receptacle and the housing sleeve and wherefrom air can escape to the environment, characterized in that the free space is constructed as a duct (12) which is provided in an outer surface of the receptacle (3) and which extends in the axial direction over the entire length of the receptacle (3).

2. A connector as claimed in claim 1, characterized in that the receptacle (3) is provided on both sides with openings for the insertion of two connector pins (1, 2).

3. A connector as claimed in claim 1 or 2, characterized in that the duct (12) is constructed as a groove (12a).

4. A connector as claimed in claim 1 or 2, characterized in that the duct (12) is constructed as a flattened portion (12b) of an cylindrical outer contour of the receptacle (3).

5. An optical fiber connector comprising:
a housing sleeve having an inside bore; and
a receptacle arranged in the bore in the housing sleeve, said receptacle having an inside bore extending in an axial direction for accommodating a connector pin having an end face, said receptacle having a radial vent hole opening into an area of the receptacle bore which accommodates the end face of the connector pin; characterized in that the receptacle has an outer surface with a duct, said duct extending in the axial direction in the outer surface, said duct communicating with the radial vent hole.

6. An optical fiber connector as claimed in claim 5, characterized in that the housing sleeve has an end, and the connector further comprises a screw cap which can be screwed onto the end of the housing sleeve.

7. An optical fiber connector as claimed in claim 6, characterized in that the receptacle has two opposite open ends communicating with the bore in the receptacle for the insertion of a connector pin in each end.

8. An optical fiber connector as claimed in claim 7, characterized in that the duct in the receptacle is a groove in the outer surface of the receptacle.

9. An optical fiber connector as claimed in claim 7, characterized in that the duct in the receptacle is a flattened portion of the outer surface of the receptacle.

* * * * *